(12) United States Patent
Ishii et al.

(10) Patent No.: US 11,776,320 B2
(45) Date of Patent: Oct. 3, 2023

(54) INFORMATION PROCESSING METHOD OF PREDICTING CALCULATION AMOUNT SUITABLE FOR RECOGNIZING MOTION OF OBJECT

(71) Applicant: Panasonic Intellectual Property Corporation of America, Torrance, CA (US)

(72) Inventors: Yasunori Ishii, Osaka (JP); Hironobu Fujiyoshi, Aichi (JP); Takayoshi Yamashita, Aichi (JP); Tsubasa Hirakawa, Aichi (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 232 days.

(21) Appl. No.: 17/336,972

(22) Filed: Jun. 2, 2021

(65) Prior Publication Data

US 2021/0286982 A1 Sep. 16, 2021

Related U.S. Application Data

(63) Continuation of application No. PCT/JP2020/029615, filed on Aug. 3, 2020.

(30) Foreign Application Priority Data

Sep. 26, 2019 (JP) .................. 2019-175329

(51) Int. Cl.
*G06V 40/20* (2022.01)
*G06T 7/215* (2017.01)
*G06V 20/56* (2022.01)

(52) U.S. Cl.
CPC .............. *G06V 40/20* (2022.01); *G06T 7/215* (2017.01); *G06V 20/56* (2022.01)

(58) Field of Classification Search
CPC ........ G06V 40/20; G06V 20/58; G06V 20/56; G06T 7/20; G06T 7/215; G06T 7/246;
(Continued)

(56) References Cited

U.S. PATENT DOCUMENTS

| 2010/0271484 A1* | 10/2010 | Fishwick | ............... H04N 5/145 |
| | | | 348/169 |
| 2011/0013840 A1* | 1/2011 | Iwasaki | ................... G06T 7/215 |
| | | | 382/173 |

(Continued)

FOREIGN PATENT DOCUMENTS

| CN | 108229495 A * | 6/2018 | ........... G06K 9/4671 |
| EP | 1847957 A2 * | 10/2007 | ............. G06T 5/002 |

(Continued)

OTHER PUBLICATIONS

Karmann, Time Recursive Motion Estimation Using Dynamical Models for Motion Prediction, 1990, IEEE, 10th International Conference on Pattern Recognition (vol. i, pp. 268-270 vol. 1) (Year: 1990).*

(Continued)

*Primary Examiner* — Ian L Lemieux
*Assistant Examiner* — Woo C Rhim
(74) *Attorney, Agent, or Firm* — Wenderoth, Lind & Ponack, L.L.P.

(57) ABSTRACT

An information processing method includes processing of: acquiring, from a plurality of time-series images in which an object is captured, first information including at least a plurality of positions or a plurality of sizes of the object; executing prediction processing of predicting second information including at least one of a position or a size of the object at a next time point in a time-series based on the first information and recursively executing the prediction processing based on the first information and the second infor- (Continued)

mation to predict the second information of the object at a time point further next to the next time point; executing recognition processing of recognizing motion of the object based on the second information; and determining a total number of times of recursion of the prediction processing based on a result of the recognition processing.

9 Claims, 5 Drawing Sheets

(58) Field of Classification Search
CPC .......... G06T 2207/10016; G06T 7/248; G06T 7/251; G06T 2207/30241; G06T 7/70; G06T 7/74; G06T 7/73; G06T 7/75; G06T 2207/30196; H04N 19/503; H04N 19/51; H04N 19/513; H04N 19/136; H04N 19/137; H04N 19/139; H04N 5/144; H04N 5/145; H04N 19/58; H04N 19/573; B60W 30/095; B60W 30/0953; B60W 30/0956; B60W 40/10
See application file for complete search history.

(56) References Cited

U.S. PATENT DOCUMENTS

| | | | | |
|---|---|---|---|---|
| 2011/0296307 A1* | 12/2011 | Inami | .................. | G06F 3/04842 715/719 |
| 2014/0303883 A1* | 10/2014 | Aso | ....................... | B60W 30/10 701/300 |
| 2015/0091832 A1* | 4/2015 | Mizunuma | ......... | G06F 3/03545 345/173 |
| 2015/0183431 A1* | 7/2015 | Nanami | ............. | B60W 30/095 701/301 |
| 2015/0348279 A1* | 12/2015 | Fishwick | ................ | G06T 7/238 382/107 |
| 2018/0339710 A1* | 11/2018 | Hashimoto | ....... | B60W 30/0956 |
| 2019/0009787 A1* | 1/2019 | Ishioka | .................. | G08G 1/166 |
| 2020/0293064 A1* | 9/2020 | Wu | .......................... | G06T 7/20 |
| 2021/0042526 A1* | 2/2021 | Ikeda | ..................... | A63F 7/0632 |
| 2021/0042542 A1* | 2/2021 | Littman | ............... | G05D 1/0231 |
| 2021/0335131 A1* | 10/2021 | Ishikawa | ................. | G06N 3/04 |
| 2022/0217276 A1* | 7/2022 | Takatori | ................. | H04N 23/61 |
| 2022/0230458 A1* | 7/2022 | Iwane | .................... | G06V 10/70 |

FOREIGN PATENT DOCUMENTS

| | | | | |
|---|---|---|---|---|
| JP | 4-3595 | | 1/1992 | |
| JP | 2011-227582 | | 11/2011 | |
| JP | 2011227582 | A * | 11/2011 | |
| JP | 2012203439 | A * | 10/2012 | |
| JP | 6574224 | B2 * | 9/2019 | .......... B60W 30/09 |
| WO | 2017/029924 | | 2/2017 | |
| WO | WO-2018097117 | A1 * | 5/2018 | .......... H04N 19/513 |
| WO | WO-2018225187 | A1 * | 12/2018 | .............. G06F 3/011 |

OTHER PUBLICATIONS

International Search Report (ISR) dated Sep. 8, 2020 in International (PCT) Application No. PCT/JP2020/029615.
Apratim Bhattacharyya, et al., "Long-Term On-Board Prediction of People in Traffic Scenes under Uncertainty", IEEE Conference on Computer Vision and Pattern Recognition (CVPR), 2018, pp. 4194-4202.

* cited by examiner

INFORMATION PROCESSING METHOD OF PREDICTING CALCULATION AMOUNT SUITABLE FOR RECOGNIZING MOTION OF OBJECT

CROSS REFERENCE TO RELATED APPLICATIONS

This is a continuation application of PCT International Application No. PCT/JP2020/029615 filed on Aug. 3, 2020, designating the United States of America, which is based on and claims priority of Japanese Patent Application No. 2019-175329 filed on Sep. 26, 2019. The entire disclosures of the above-identified applications, including the specifications, drawings and claims are incorporated herein by reference in their entirety.

FIELD

The present disclosure relates to an information processing method, recording medium, and information processing device.

BACKGROUND

Technologies have been suggested which predict a future position of an object by use of past movement information of an own vehicle and past position information of a number of frames of an object captured on a camera (for example, Non-Patent Literature (NPTL) 1). The position of the object at a given future point is predicted in the technology disclosed in NPTL 1.

Also disclosed is a technology of predicting the position of an object at a given future point and recursively executing prediction processing of predicting the position of the object at a next time point in a times series by use of the predicted position to sequentially predict future positions of the object (for example, Patent Literature (PTL) 1).

CITATION LIST

Patent Literature

PTL 1: International Publication No. 2017/029924

Non Patent Literature

NPL 1: Long-Term On-Board Prediction of People in Traffic Scenes under Uncertainty (CVPR2018)

SUMMARY

Technical Problem

However, with the technology disclosed in PTL 1, there has been a risk that the amount of calculation increases as a result of recursively repeating the prediction processing. It is also possible to recognize the motion of the object based on positions (at least one of the position or size of an image) of a plurality of objects.

Thus, the present disclosure provides an information processing method, etc., which is capable of processing of predicting a calculation amount suitable for the motion of an object.

Solution to Problem

An information processing method according to the present disclosure includes: acquiring, from a plurality of time-series images in which an object is captured, first information including at least a plurality of positions or a plurality of sizes of the object; executing prediction processing of predicting second information including at least one of a position or a size of the object at a next time point in a time-series based on the first information; recursively executing the prediction processing based on the first information and the second information to predict the second information of the object at a time point further next to the next time point; executing recognition processing of recognizing motion of the object based on the second information; and determining a total number of times of recursion of the prediction processing based on a result of the recognition processing.

Note that a comprehensive and detailed aspect described above may be realized by a system, a method, an integrated circuit, a computer program, or a recording medium such as a computer-readable CD-ROM or may be realized by combining together the system, the method, the integrated circuit, the computer program, and the recording medium in a desired manner.

Advantageous Effects

With an information processing method, etc., according to one aspect of the present disclosure, it is possible to perform processing of predicting a calculation amount suitable for recognizing the motion of an object.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Background for Achieving One Aspect of Present Disclosure

First, the background for achieving one aspect of the present disclosure will be described with reference to FIGS. 1 and 2.

Figure 1:
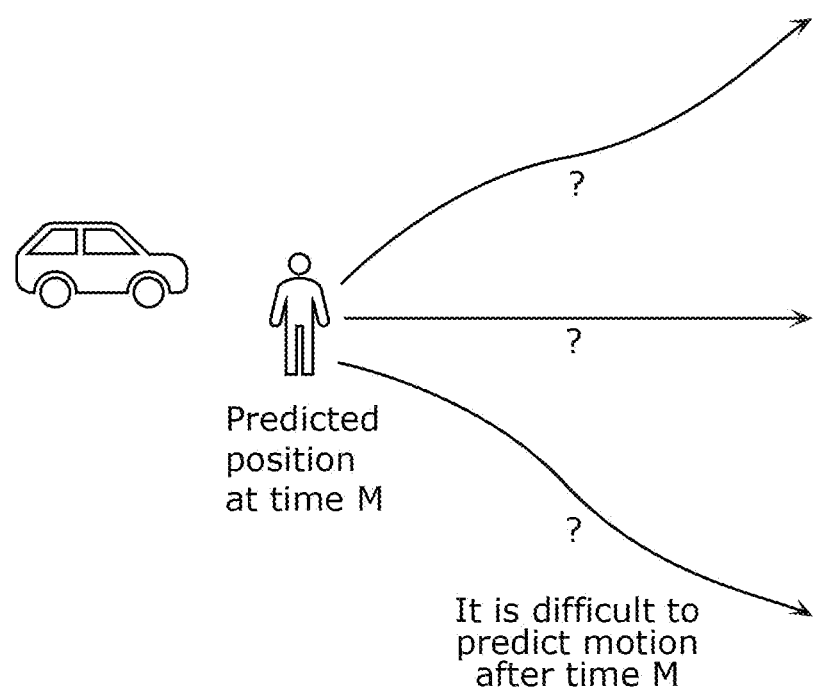
FIG. 1 is a diagram illustrating that it is difficult to predict the motion of an object only by predicting the position of the object at a given future time point.

FIG. 1 is a diagram illustrating that it is difficult to predict the motion of an object only by predicting the position of the object at a given future time point.

Figure 2:
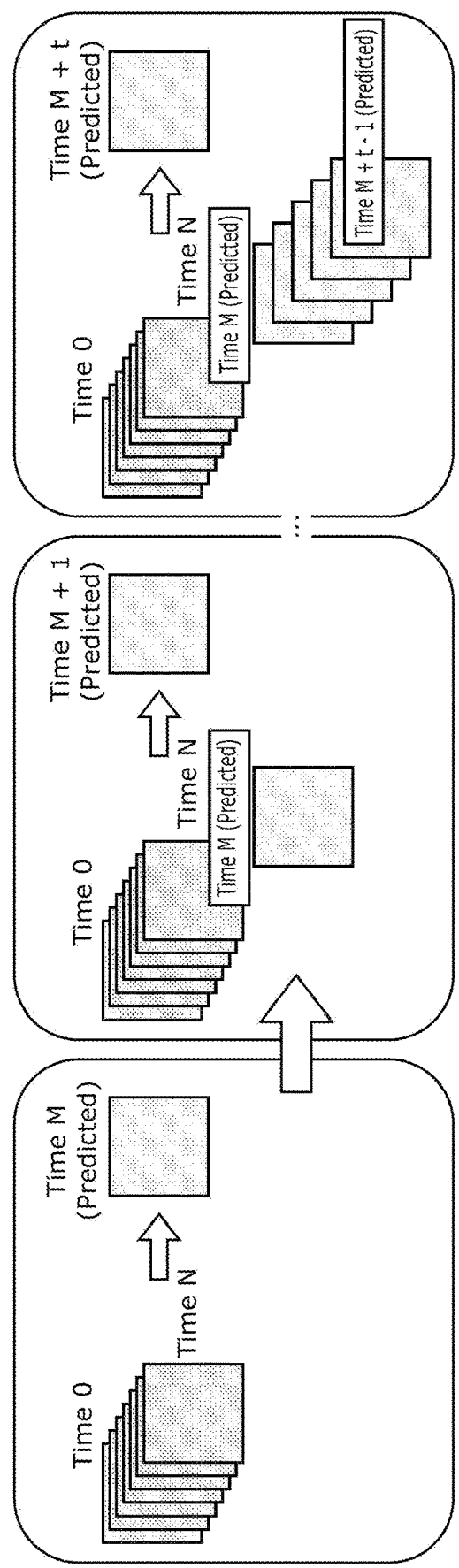
FIG. 2 is a diagram illustrating prediction processing recursively executed.

FIG. 2 is a diagram illustrating prediction processing recursively executed.

As illustrated in NPTL 1, the past movement information of an own vehicle calculated by use of an odometry or the like and the past position information of the several number of frames of the object captured on the camera can be used to predict the position of the object at future time M.

However, as illustrated in FIG. 1, the motion of the object after time M cannot be recognized only from the predicted position of the object at the time M, and it is difficult to predict the action or intention of the object after time T. In the example illustrated in FIG. 1, a person located at the predicted position at the time M may jump out to the front of the vehicle, may go ahead in parallel to the travel direction of the vehicle, or may separate from the vehicle, but it is difficult to predict the motion of the person after the time M.

Thus, as disclosed in PTL 1, the motion of the object after the time M can be predicted by recursively executing the prediction processing. More specifically, as illustrated in FIG. 2, for example, the position information of the object at future specific time M after time N is first predicted by use of a data set such as the position information of the object until time N at which the object is extracted from a plurality of images until time N. Next, for example, the position information of the object at time next to the time M (for example, time corresponding to the next frame of the time M) is predicted by adding, for example, the position information of the object at the time M predicted to a data set and using the aforementioned data set. Then, for example, position information of the object at time further next to the time M+1 (for example, time M+2) is predicted by use of the data set obtained by further adding, for example, the position information of the object at the predicted time M+1. Repeating this until the time M+t makes it possible to predict a position string of the object from the time M to the time M+t, that is, the motion of the object.

However, PTL 1 does not disclose to what degree the aforementioned t is set, in other words, to what degree the total number of times of recursively executing the prediction processing (hereinafter referred to as the total number of times of recursion) is set. Thus, in a case where it is too small, information on the position of the object for recognizing the motion of the object (at least one of the position or the size on the image) may be insufficient. In other words, with the small number of times of recursion, the amount of information on the position of the object for recognizing the motion of the object is insufficient even if the position of the object can be recognized. Moreover, in a case where t is too large, the calculation amount for recognizing the motion of the object increases. In other words, with a large number of times of recursion, the number of times of executing the prediction processing increases, leading to an increase in the calculation amount.

Thus, an information processing method according to one aspect of the present disclosure includes: acquiring first information including at least a plurality of positions or a plurality of sizes of an object from a plurality of time-series images in which the object is captured; executing prediction processing of predicting second information including at least one of a position or a size of the object at the next time point in the time series; recursively executing the prediction processing based on the first information and the second information to predict the second information of the object at a time point further next to the aforementioned next time point; executing recognition processing of recognizing the motion of the object based on the second information; and determining the number of times of recursion of the prediction processing based on a result of the recognition processing.

As described above, as a result of determining the total number of times of recursion of the prediction processing based on the recognition result of the motion of the object, a total number of times of recursion can be determined to be a total number of times sufficient for recognizing the motion of the object. For example, it is possible to suppress failure in the recognition of the motion (then processing based on the recognized motion) caused by the shortage of information for recognizing the motion of the object due to a too small total number of times of recursion. Moreover, for example, it is possible to suppress an increase in the calculation amount due to a too large total number of times of recursion or it is possible to suppress failure in the recognition of the motion as a result of unnecessary position prediction. As described above, since the total number of times of recursion can be determined in accordance with the recognition result of the motion of the object, both the performance in the recognition of the motion of the object and the calculation amount can be achieved. In other words, it is possible to perform processing of predicting the calculation amount suitable for recognizing the motion of the object. Note that the motion of the object includes: motion for which the total number of times of recursion of the prediction processing had better be small; and motion for which the total number of times of recursion of the prediction processing had better be large. On the contrary, for example, a table indicating correspondence between the motion of the object and the total number of times of recursion can be previously created or, for example, a function for calculating the total number of times of recursion in accordance with the motion of the object can be previously created. Thus, the recognition of the motion of the object makes it possible to determine the total number of times of recursion in accordance with the recognized motion.

Moreover, the recognition processing may be executed based on the second information and the first information.

Consequently, not only the predicted second information but also, for example, the first information previously prepared for predicting the second information can be used for the recognition processing to thereby improve the accuracy in the recognition processing.

Moreover, the motion of the object may include a moving direction.

The moving direction as the motion of the object includes: a moving direction in which the total number of times of recursion of the prediction processing had better be smaller; and a moving direction in which the total number of times of recursion of the prediction processing had better be larger. Thus, for example, a table indicating correspondence between the moving direction of the object and the total number of times of recursion can be previously created or, for example, a function for calculating the total number of times of recursion can be previously created in accordance with the moving direction of the object to recognize the moving direction of the object to thereby determine the total number of times of recursion in accordance with the recognized moving direction.

Moreover, the motion of the object may include a change pattern of the moving direction.

The change pattern of the moving direction as the motion of the object includes: a change pattern of the moving direction with which the total number of times of recursion of the prediction processing has better be smaller; and a change pattern of the moving direction with which the total number of times of recursion of the prediction processing has better be larger. Thus, for example, a table indicating the correspondence between the change pattern of the moving direction of the object and the total number of times of recursion can be previously created or, for example, a function for calculating the total number of times of recursion in accordance with the change pattern of the moving direction of the object can be previously created to recognize the change pattern of the moving direction to thereby determine the total number of times of recursion in accordance with the recognized change pattern of the moving direction.

Moreover, the motion of the object may include a moving speed.

The moving speed as the motion of the object includes: a moving speed with which the total number of times of recursion of the prediction processing had better be smaller; and a moving speed with which the total number of times of recursion of the prediction processing had better be larger. Thus, for example, a table indicating correspondence between the moving speed of the object and the total number of times of recursion can be previously created or, for example, a function for calculating the total number of times of recursion in accordance with the moving speed of the object can be previously created to recognize the moving speed of the object to thereby determine the total number of times of recursion in accordance with the recognized moving speed.

Moreover, the determination of the total number of times of recursion of the prediction processing may include determining the total number of times of recursion of the prediction processing in accordance with the recognized degree of the motion of the object as a result of the recognition processing.

Consequently, it is possible to determine whether to increase or decrease the total number of times of recursion in accordance with the degree of the motion of the object.

For example, the determination of the total number of times of recursion of the prediction processing may include determining the total number of times of recursion of the prediction processing to be a smaller value with an increase in the degree of the motion of the object or may include determining the total number of times of recursion of the prediction processing to be a larger value with a decrease in the degree of the motion of the object.

For example, in a case where the degree of the motion of the object is large, the influence of the object on the surroundings or the influence of the surroundings on the object is large, and the total number of times of recursion of the prediction processing can be set to a value smaller than a value when the degree of the motion of the object is small to thereby end the prediction processing early and immediately perform, for example, control in accordance with the action or the intention of the object. Moreover, in a case where the degree of the motion of the object is large, a change in the motion of the object captured on each frame of the image is large, and increasing the total number of times of recursion of the prediction processing for such motion increases the possibility of predicting the motion of the object, resulting in a deterioration in the prediction accuracy. Thus, in a case where the degree of the motion of the object is large, the total number of times of recursion of the prediction processing can be set to a value smaller than a value in a case where the degree of the motion of the object is small to thereby make it difficult to deteriorate the accuracy in the prediction of the motion of the object. Moreover, in a case where the degree of the motion of the object is small, the influence of the object on the surroundings or the influence of the surroundings on the object is small, and the total number of times of recursion of the prediction processing can be set to a value larger than a value in a case where the degree of the motion of the object is large to thereby continuously perform the prediction processing to be prepared for future action or intention of the object. Moreover, in a case where the degree of the motion of the object is small, a change in the motion of the object captured on each frame of the image is small, and the prediction accuracy hardly deteriorates even when the total number of times of recursion of the prediction processing on such motion is increased.

Moreover, the determination of the total number of times of recursion of the prediction processing may include determining the total number of times of recursion of the prediction processing in accordance with the recognized type of the motion of the object as a result of the recognition processing.

Consequently, the total number of times of recursion of the prediction processing can be determined in accordance with the type of the motion of the object. Thus, it is easy to perform the processing on a table as described above.

Moreover, the determination of the total number of times of recursion of the prediction processing may include determining the total number of times of recursion of the prediction processing in accordance with a recognized recognition rate of the motion of the object as a result of the recognition processing.

Consequently, the total number of times of recursion of prediction processing can be determined in accordance with the recognition rate of the motion of the object. Thus, in a case where the recognition rate is low, the total number of times of recursion can be increased to thereby increase the recognizability. Moreover, the total number of times of recursion for motion with which the recognition rate is greater than or equal to a threshold value can be determined to thereby suppress the determination of the total number of times of recursion in accordance with erroneous motion.

Moreover, a recording medium according to one aspect of the present disclosure is a non-transitory computer-readable recording medium having a program recorded thereon for causing a computer to execute the aforementioned information processing method.

Consequently, a recording medium capable of performing processing of predicting the calculation amount suitable for the recognition of the motion of the object can be provided.

Moreover, an information processing device according to one aspect of the present disclosure includes: an acquisition unit which acquires, from a plurality of time-series images in which an object is captured, first information including at least a plurality of positions or a plurality of sizes of the object; a prediction unit which executes prediction processing of predicting, based on the first information, second information including at least one of a position or a size of the object at a next time point in time-series and recursively executes the prediction processing based on the first information and the second information to predict the second information of the object at a time point further next to the aforementioned next time point; a recognition unit which executes recognition processing of recognizing the motion of the object based on the second information; and a determination unit which determines a total number of times of recursion of the prediction processing based on a result of the recognition processing.

Consequently, an information processing device can be provided which is capable of performing processing of predicting the calculation amount suitable for recognizing the motion of the object.

Note that these comprehensive or detailed modes may be realized by a system, a method, an integrated circuit, a computer program, or a recording medium such as a computer-readable CD-ROM or may be realized by combining together the system, the method, the integrated circuit, the computer program, and the recording medium in a desired manner.

Hereinafter, embodiments will be described in detail with reference to the drawings.

Note that each embodiment described below illustrates a comprehensive and detailed example. Numerical values, shapes, materials, components, arrangement positions and connection modes of the components, steps, a sequence of steps, etc., illustrated in the embodiments below each form one example and are not intended to limit the present disclosure in any manner.

Embodiment

Hereinafter, the embodiment will be described with reference to FIGS. 3 to 5.

Figure 3:
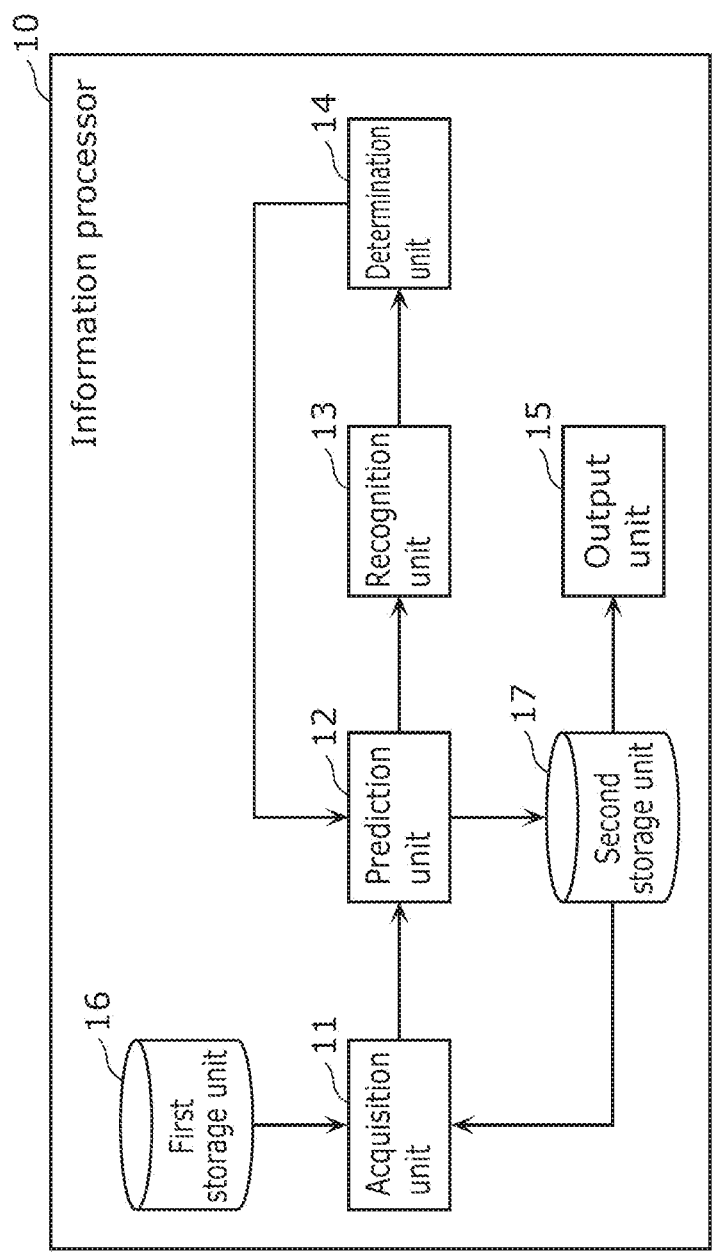
FIG. 3 is a block diagram illustrating one example of a configuration of an information processing device according to an embodiment.

FIG. 3 is a block diagram illustrating one example of a configuration of information processing device 10 according to the embodiment.

Information processing device 10 is a device which predicts future motion of an object, which has been obtained through photographing with a camera or the like, by use of a plurality of time-series images in which the object is captured. For example, information processing device 10 may be a device which is loaded on a vehicle or may be a server deice which is capable of wireless communication with the vehicle. In this case, information processing device 10 predicts the future motion of a person or an animal around the aforementioned vehicle or the vehicle as an object. Moreover, for example, information processing device 10 may be a device which is installed indoors or may be a server device which is capable of communication with a device used indoors. In this case, information processing device 10 predicts the future motion of, for example, a person or an animal located indoors as the object.

Information processing device 10 includes: acquisition unit 11, prediction unit 12, recognition unit 13, determination unit 14, output unit 15, first storage unit 16, and second storage unit 17. Information processing device 10 is a computer which includes a processor, memories, etc. The memories are a read only memory (ROM), a random access memory (RAM), etc., and can store programs executed by the processor. Note that first storage unit 16 and second storage unit 17 each form one example of a memory. First storage unit 16 and second storage unit 17 may be each realized by the same memory or may be realized by different memories. Acquisition unit 11, prediction unit 12, recognition unit 13, determination unit 14, and output unit 15 are realized by, for example, a processor which executes the programs stored in the memory. Note that components forming information processing device 10 may be arranged so as to be dispersed in a plurality of computers (server devices or the like).

First storage unit 16 stores a plurality of time-series images in which the object is captured. For example, in a case where information processing device 10 is a device which is loaded on a vehicle or a server device which is capable of wireless communication with the vehicle, first storage unit 16 cumulates the plurality of images obtained up to the present by photographing with a camera loaded on the vehicle. In this case, first storage unit 16 may store information for odometry, for example, information on, for example, a rotation angle of a tire of the vehicle up to the present. Moreover, for example, in a case where information processing device 10 is a device which is installed indoors or a server device which is capable of communication with a device used indoors, first storage unit 16 cumulates the plurality of images obtained up to the present by the photographing with the camera installed indoors.

Second storage unit 17 stores second information predicted by prediction unit 12. The second information will be described later on.

The functions of acquisition unit 11, prediction unit 12, recognition unit 13, determination unit 14, and output unit 15 realized by, for example, the processor which executes the programs will be described with reference to FIG. 4.

Figure 4:
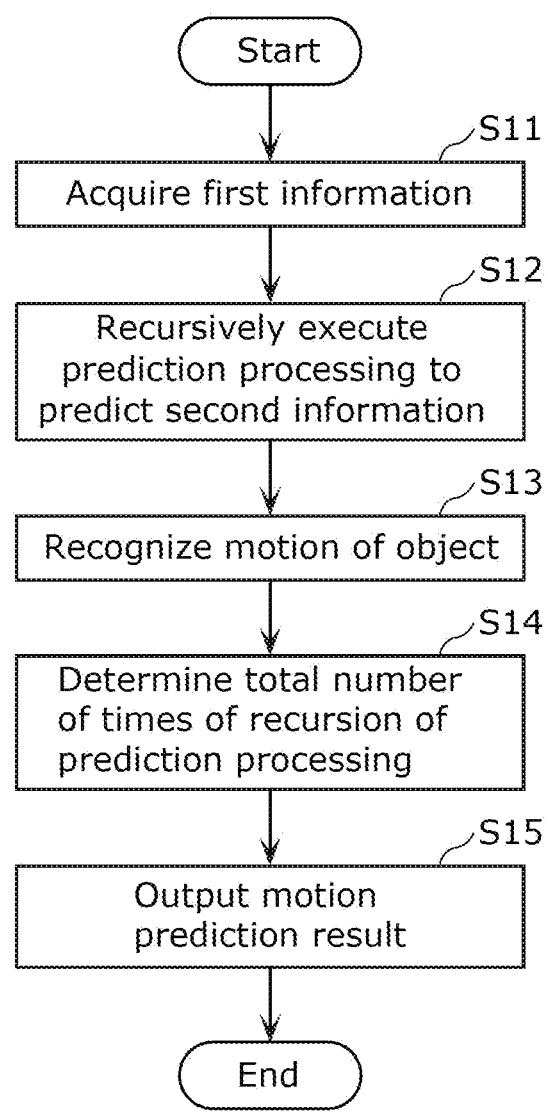
FIG. 4 is a flowchart illustrating one example of an information processing method according to the embodiment.

FIG. 4 is a flowchart illustrating one example of an information processing method according to the embodiment. For example, the information processing method according to the embodiment is a method executed by the processor included in information processing device 10. That is, FIG. 4 in this case is a flowchart illustrating operations of acquisition unit 11, prediction unit 12, recognition unit 13, determination unit 14, and output unit 15.

Acquisition unit 11 acquires the first information including at least a plurality of positions or a plurality of sizes of the object from among the plurality of times-series images in which the object is captured (step S11). For example, first storage unit 16 stores the plurality of images acquired up to the present by the photographing with the camera or the like. Acquisition unit 11 acquires the first information from the plurality of images stored in first storage unit 16. For example, acquisition unit 11 extracts at least one of the position or the size of the object for each of the plurality of images to thereby acquire the first information. The first information may include a plurality of positions of the object only, may include a plurality of sizes of the object only, or may include a plurality of each of the positions and the sizes of the object. The two-dimensional motion of the object can be recognized based on the position of the object captured on each of the plurality of images, and the motion of the object in a depth direction can be recognized based on the size of the object captured on each of the plurality of images. Note that the position is not limited to the two-dimensional position on the image but may also be a three-dimensional position. The three-dimensional position includes depth information which permits the recognition of the motion of the object in the depth direction but the first information may not include the size in this case.

Note that in a case where information processing device 10 is a device which is loaded on a vehicle or a server device which is capable of wireless communication with the vehicle, the position or the size of the object captured on the camera loaded on the vehicle changes depending on not only the movement of the object itself but also the movement of the vehicle. Thus, acquisition unit 11 may acquire the information for odometry. Consequently, when the position or the size of the object captured on the camera loaded on the vehicle is influenced by the movement of the vehicle, a change in the position of the vehicle can be estimated through the odometry, which makes it possible to subtract an amount of the influence by the change in the position of the vehicle from the change in the position or the size of the object captured on the camera loaded on the vehicle. That is, the change in the position or the size of the object included in the first information for each of the plurality of images can be changed by the movement of the object itself. Note that the change in the position of the vehicle can be estimated based on the change in the position or the size of a fixed object such as a building, a sign, or a signal captured on the camera even without use of the information for odometry, and thus acquisition unit 11 may not acquire the information for odometry.

Prediction unit 12 executes prediction processing of predicting the second information including at least one of the position or the size of the object at a next time point in the time series based on the first information, and recursively executes the prediction processing to predict the second information of the object at a time point further next to the aforementioned next time point based on the first information and the second information (step S12). The operation of prediction unit 12 will be described with reference to FIG. 2 again.

First, prediction unit 12 executes prediction processing of predicting the second information including at least one of the position or the size of the object at time M as the next time point in the time series based on the first information including at least a plurality of positions or a plurality of sizes of the object until time N extracted from a plurality of time-series images in which the object is captured (images from time 0 to time N in FIG. 2). Next, prediction unit 12 recursively executes the prediction processing based on the first information and the second information of the object at predicted time M and predicts the second information of the object at a time point further next to the time M (for example, time M+1). Recursively executing the prediction processing is sequentially predicting the second information of a future object by repeatedly performing the prediction processing again by use of the second information of the object predicted by executing the prediction processing to predict the second information of the object at the next time point and performing the prediction processing again by use of the predicted second information to predict the second information at the further next time point.

For example, the second information predicted by prediction unit 12 is stored into second storage unit 17 and added every time the prediction processing is recursively performed. Acquisition unit 11 acquires the first information from first storage unit 16 and acquires the second information from second storage unit 17, and prediction unit 12 recursively executes the prediction processing based on the first information and the second information acquired by acquisition unit 11.

Recognition unit 13 executes the recognition processing of recognizing the motion of the object based on the second information (step S13). For example, upon the execution of the recognition processing, recognition unit 13 uses the second information at at least two time points predicted by recursively executing the prediction processing. Note that the recognition processing may be executed based on the second information and the first information. That is, recognition unit 13 recognizes the motion of the object based on at least the second information but may execute the recognition processing based on the first information in addition to the second information. In this case, recognition unit 13 may use a plurality of positions or a plurality of sizes or a plurality of positions and a plurality of sizes for all the plurality of images included in the first information or may use the position or the size or the position and the size for at least one of the plurality of images. For example, upon executing the recognition processing, recognition unit 13 uses the second information at at least one time point predicted by recursively executing the prediction processing and the position or the size or the position and the size for at least one of the plurality of images included in the first information.

The motion of the object includes, for example, a moving direction. That is, recognition unit 13 recognizes in what direction the object moves. For example, the moving direction of the object can be obtained from two positions, two sizes, or both the two positions and the two sizes of the object.

Moreover, the motion of the object includes, for example, a change pattern of the moving direction. That is, recognition unit 13 recognizes how the moving direction of the object changes. For example, recognition unit 13 recognizes whether the object is staggering or going straight. For example, the change pattern of the moving direction of the object can be obtained from three or more positions, three or more sizes, or both the three or more positions and the three or more sizes of the object.

Moreover, the motion of the object includes, for example, a moving speed. That is, recognition unit 13 recognizes the moving speed of the object. For example, recognition unit 13 recognizes whether the object (for example, a person) is walking, running, or in stop. For example, the moving speed of the object can be obtained from two positions, two sizes, or both the two positions and the two sizes of the object and an interval between times at which two images corresponding to the two positions or the two sizes were photographed.

Determination unit 14 determines the total number of times of recursion of the prediction processing based on a result of the recognition processing (step S14). For example, determination unit 14 determines the total number of times of recursion of the prediction processing in accordance with the degree of the motion of the object recognized as the result of the recognition processing. More specifically, determination unit 14 determines the total number of times of recursion of the prediction processing to be a smaller value with an increase in the degree of the motion of the object or determines the total number of times of recursion of the prediction processing to be a larger value with a decrease in the degree of the motion of the object. The degree of the motion of the object is great, for example, in a case where the object is staggering or running. The degree of the motion of the object is small, for example, in a case where the object is going straight, walking, or sleeping.

When the degree of the motion of the object is large, the influence of the object on the surroundings or the influence of the surroundings on the object is large, and setting the total number of times of recursion of the prediction processing to a value smaller than the value when the degree of the motion of the object is small makes it possible to immediately perform, for example, control in accordance with the action or intention of the object after early ending of the prediction processing. For example, determination unit 14 determines the total number of times of recursion of the prediction processing to a smaller value when the object is staggering. Consequently, for example, a vehicle can immediately perform operation in accordance with the action of the staggering object (for example, such control that reduces the speed or separates the vehicle from the object). Moreover, for example, when the object is running indoors, determination unit 14 determines the total number of times of recursion of the prediction processing to be a smaller value. Consequently, for example, an indoor device can immediately perform operation in accordance with the intention of the running object (for example, such control that supports action attempted to be performed immediately by the object).

Moreover, when the degree of the motion of the object is large, a change in the motion of the object captured on each frame of image is large, and increasing the total number of times of recursion of the prediction processing on such motion increases the possibility of the prediction of the motion of the object, leading to a deterioration in the prediction accuracy. Thus, when the degree of the motion of the object is large, the total number of times of recursion of the prediction processing can be set to a small value to make it difficult to deteriorate the accuracy in predicting the motion of the object.

Moreover, when the degree of the motion of the object is small, the influence of object on the surroundings or the influence of the surroundings on the object is small, and the total number of times of recursion of the prediction processing can be set to a value larger than the value when the degree of the motion of the object is large to continuously perform the prediction processing to be prepared for future action or intention of the object. For example, determination unit 14 determines the total number of times of recursion of the prediction processing to be a large value when the object is going straight. Consequently, for example, the vehicle can become able to respond to future action of an object going straight. Moreover, for example, determination unit 14 determines the total number of times of recursion of the prediction processing to be a small value when the object is walking indoors. Consequently, for example, the indoor device can respond to future intention of the walking object.

Moreover, when the degree of the motion of the object is small, a change in the motion of the object captured on each frame of the image is small, and the prediction accuracy hardly deteriorates even when the total number of times of recursion of the prediction processing on such motion is increased.

Note that determination unit 14 may determine the total number of times of recursion of the prediction processing based on the moving direction of the object. For example, in a case where the moving direction of the object is a direction directed towards the front of the vehicle, determination unit 14 determines the total number of times of recursion of the prediction processing to be a small value. Consequently, for example, the vehicle can immediately perform operation (for example, avoidance control) in accordance with the action of the object which is about to jump in front of the vehicle. Moreover, for example, in a case where the moving direction of the object is a direction separating from the vehicle, determination unit 14 determines the total number of times of recursion of the prediction processing to be a small value. Consequently, for example, the vehicle can become able to respond to future action of the object separating from the vehicle.

Output unit 15 outputs a prediction result of the motion of the object predicted through the performance of the prediction processing a number of times corresponding to the total number of times of recursion determined (step S15). Output unit 15 outputs the prediction result to, for example, the vehicle or an indoor device.

Next, a detailed example of the prediction processing recursively performed will be described with reference to FIG. 5.

Figure 5:
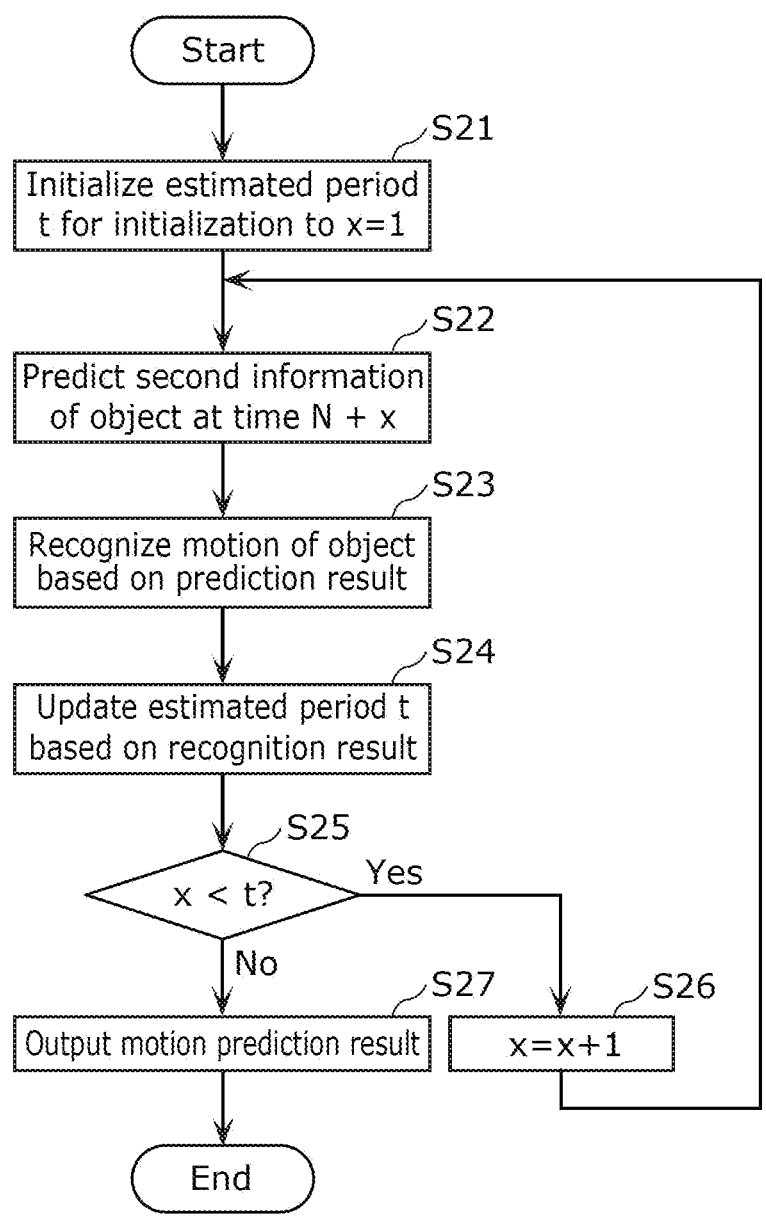
FIG. 5 is a flowchart illustrating a detailed example of prediction processing according to the embodiment.

FIG. 5 is a flowchart illustrating the detailed example of the prediction processing according to the embodiment.

First, prediction unit 12 initializes estimated period t to initialize x to 1 (step S21). The estimated period t is a period during which the recursively executed prediction processing is performed and corresponds to the total number of times of recursion described above. For example, in a case where the estimated period t is one minute, one minute of the estimated period corresponds to 60 times of recursion when the prediction processing is performed once every second. The estimated period t is, for example, a variable, for which a value according to the recognition result obtained at recognition unit 13 is substituted. An initial value of the estimated period t is appropriately determined in accordance with application purpose of information processing device 10. X is provided for judging whether or not to end the recursively executed prediction processing, and is, for example, a variable which is incremented every time the prediction processing is executed. That is, x represents the period or a total number of times of the prediction processing performed up to the present.

Next, prediction unit 12 predicts the second information of the object at time N+x (step S22). Prediction unit 12 uses the first information until the time N to predict the second information upon the first prediction after the initialization of x, that is, when x is 1. Upon the performance of the processing in step S22 next time and thereafter, the second information used up to the present is also used to recursively perform the prediction processing and the second information of the object at a time point next to a time point at which the previous prediction was performed is sequentially predicted.

Next, recognition unit 13 recognizes the motion of the object based on a prediction result obtained at prediction unit 12 (step S23). At this point, recognition unit 13 may recognize the motion of the object by use of the first information until the time N. Upon the recognition of the motion of the object, not only information on a future position or size of the object predicted but also information on the past position or size of the object can be used to improve the accuracy in the recognition processing. Note that recognition unit 13 may recognize the latest motion of the object by use of the second information predicted latest.

Next, determination unit 14 updates the estimated period t based on the recognition result obtained at recognition unit 13 (step S24). Information processing device 10 stores a table in which the estimated period t is associated for each recognition result (for example, a type of the motion of the object), and determination unit 14 compares the recognition result with the table to thereby update the current estimated period t to an estimated period t corresponding to the recognition result. For example, when the recognition result is identical to the recognition result obtained upon the last prediction processing, the estimated period t is maintained, that is, the estimated period t is updated to the same value. For example, a recognition result in which the recognition rate is greater than or equal to a threshold value is used for updating the estimated period t. Moreover, the recognition result and the estimated period t may not be in one-to-one correspondence with each other, and the estimated period t may be calculated from, for example, a function according to the recognition rate of the recognition result (more specifically, recognition rate of the motion of the object). For example, in a case where it is recognized that the object is staggering, the estimated period t may be calculated by use of such a function that the estimated period t decreases with an increase in the rate of recognition that the object is staggering.

As described above, determination unit 14 may determine the total number of times of recursion of the prediction processing in accordance with the type of the motion of the object recognized as the recognition result. Consequently, the total number of times of recursion of the prediction processing can be determined in accordance with the recognition rate of the motion of the object. Thus, processing is easily performed on the table as described above. Moreover, determination unit 14 may determine the total number of times of recursion of the prediction processing in accordance with the recognition rate of the motion of the object recognized as the result of the recognition processing. Consequently, the total number of times of recursion of the prediction processing can be determined based on the recognition rate of the motion of the object. Thus, when the recognition rate is low, possibility that it can be recognized can be increased by increasing the total number of times of recursion. Moreover, determining the total number of times of recursion in accordance with erroneous motion can be suppressed by determining the total number of times of recursion for the motion with which the recognition rate is greater than or equal to a threshold value.

Next, prediction unit 12 determines whether or not x is smaller than the estimated period t (step S25). That is, prediction unit 12 determines whether or not a period of the prediction processing performed up to the present has reached the estimated period t.

Upon determination that x is smaller than the estimated period t (Yes in step S25), prediction unit 12 increments x (step S26) and continues to recursively execute the prediction processing. That is, processing in and after step S22 is performed again. On the other hand, upon determination that x is greater than or equal to the estimated period t (No in step S25), prediction unit 12 ends the recursive execution of the prediction processing, and output unit 15 outputs a result of prediction of the motion of the object through the recursively executed prediction processing (step S27). Consequently, for example, a vehicle or an indoor device which has acquired the prediction result of the motion of the object can perform control in accordance with action or intention of the object based on future motion of the object.

Note that the estimated period t is not specifically limited as long as it can determine timing at which the recursively executed prediction processing ends, that is, it corresponds to the total number of times of recursion described above. For example, estimated time or the total number of frames may be used instead of the estimated period t. In this case, the one corresponding to the estimated time or the total number of frames is substituted in x.

As described above, as a result of determining the total number of times of recursion of the prediction processing based on the recognition result of the motion of the object, the total number of times of recursion can be determined to be a total number of times sufficient for recognizing the motion of the object. For example, it is possible to suppress failure in the recognition of the motion (then processing based on the motion recognized) as a result of shortage of information for recognizing the motion of the object due to a too insufficient total number of times of recursion. Moreover, for example, it is possible to suppress an increase in the calculation amount due to a too large total number of times of recursion or it is possible to suppress failure in the recognition of the motion as a result of unnecessary position prediction. As described above, it is possible to determine the total number of times of recursion in accordance with the recognition result of the motion of the object, and thus it is possible to achieve both recognition performance and calculation amount of the motion of the object. In other words, it is possible to perform processing of predicting the calculation amount suitable for recognizing the motion of the object.

Other Embodiments

The information processing method and information processing device 10 according to one or a plurality of aspects of the present disclosure have been described above based on the embodiment, but the present disclosure is not limited to the embodiment. Those obtained by making various modifications, conceivable to those skilled in the art, to the embodiments and a mode formed by combining together the components in the different embodiments may also be included in a range of one or a plurality of aspects of the present disclosure without departing from the spirits of the present disclosure.

The present disclosure can realize the steps included in the information processing method as a program to be executed by the processor. Further, the present disclosure can be realized as a non-transitory, computer-readable recording medium such as a CD-ROM on which the program is recorded.

For example, in a case where the present disclosure is realized as a program (software), each of the steps are executed by executing the program by use of hardware resources such as a CPU, a memory, an input and output circuit, etc. of the computer. That is, each of the steps is executed by acquiring data from the memory, the input and output circuit, or the like by the CPU for calculation or outputting a calculation result to the memory, the input and output circuit, or the like.

Note that in the embodiment described above, each of the components included in information processing device 10 may be formed by dedicated hardware or may be realized by executing a software program suitable for each component. Each component may be realized by reading and execution of the software program recorded on a recording medium such as a hard disc or a semiconductor memory by a program execution unit such as the CPU or the processor.

Part or all of the functions of information processing device 10 according to the embodiment described above is typically realized as an LSI serving as an integrated circuit. They may be individually formed with one chip or integrated in one chip to include part or all of the functions. Moreover, forming the integrated circuit is not limited to the LSI and may also be realized by a dedicated circuit or a general-purpose processor. Also permitted to use is a field programmable gate array (FPGA) which can be programmed after the manufacture of the LSI or a reconfigurable processor may also be used which is capable of reconfiguring the connection and setting of a circuit cell inside the LSI.

Further, various variations obtained by making modifications to each of the embodiments of the present disclosure within a range conceivable to those skilled in the art are also included in the present disclosure without departing from the spirits of the present disclosure.

INDUSTRIAL APPLICABILITY

The information processing method, etc. of the present disclosure are applicable to, for example, a device loaded on, for example, a vehicle which performs control in accordance with a surrounding object.

The invention claimed is:

1. An information processing method, comprising:
acquiring, from a plurality of time-series images in which an object is captured, first information including at least a plurality of positions or a plurality of sizes of the object;
executing prediction processing of predicting second information including at least one of a position or a size of the object at a next time point in a time-series based on the first information;
recursively executing the prediction processing based on the first information and the second information to predict third information including at least one of a position or a size of the object at a time point further next to the next time point;

executing recognition processing of recognizing motion of the object based on the second information and the third information; and determining a total number of times of recursion of the prediction processing in accordance with a recognition rate of the motion of the object recognized as a result of the recognition processing.

2. The information processing method according to claim 1, wherein
the recognition processing is executed based on the second information, the third information, and the first information.

3. The information processing method according to claim 1, wherein
the motion of the object includes a moving direction.

4. The information processing method according to claim 3, wherein
the motion of the object includes a change pattern of the moving direction.

5. The information processing method according to claim 1, wherein
the motion of the object includes a moving speed.

6. The information processing method according to claim 1, wherein
the determining further includes:
determining the total number of times of recursion of the prediction processing to be a smaller value with an increase in the recognition rate of the motion of the object, and
determining the total number of times of recursion of the prediction processing to be a larger value with a decrease in the recognition rate of the motion of the object.

7. The information processing method according to claim 1, wherein
the total number of times of recursion of the prediction processing is further determined in accordance with a type of the motion of the object recognized as a result of the recognition processing.

8. A non-transitory computer-readable recording medium having a program recorded thereon for causing a computer to execute the information processing method according to claim 1.

9. An information processing device, comprising:
a processor; and
a memory that stores a program,
wherein when the program is executed by the processor, the program causes the processor to execute:
acquiring, from a plurality of time-series images in which an object is captured, first information including at least a plurality of positions or a plurality of sizes of the object;
executing, based on the first information, prediction processing of predicting second information including at least one of a position or a size of the object at a next time point in a time series;
recursively executing the prediction processing based on the first information and the second information to predict third information including at least one of a position or a size of the object at a time point further next to the next time point;
executing recognition processing of recognizing the motion of the object based on the second information and the third information; and
determining a total number of times of recursion of the prediction processing in accordance with a recognition rate of the motion of the object recognized as a result of the recognition processing.

* * * * *